(12) United States Patent
Kokubo

(10) Patent No.: US 12,001,662 B2
(45) Date of Patent: Jun. 4, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Taiga Kokubo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 510 days.

(21) Appl. No.: 17/178,362

(22) Filed: Feb. 18, 2021

(65) Prior Publication Data

US 2022/0100359 A1 Mar. 31, 2022

(30) Foreign Application Priority Data

Sep. 29, 2020 (JP) ................................ 2020-163844

(51) Int. Cl.
| | | |
|---|---|---|
| G06F 3/048 | (2013.01) | |
| G06F 3/04817 | (2022.01) | |
| G06F 3/04842 | (2022.01) | |
| G06F 3/04845 | (2022.01) | |

(52) U.S. Cl.
CPC ...... *G06F 3/04845* (2013.01); *G06F 3/04817* (2013.01); *G06F 3/04842* (2013.01); *G06F 2203/04805* (2013.01)

(58) Field of Classification Search
CPC .......................... G06F 3/04845; G06F 3/04817
See application file for complete search history.

(56) References Cited

U.S. PATENT DOCUMENTS

| | | | | |
|---|---|---|---|---|
| 7,587,683 | B2 * | 9/2009 | Ito | H04M 1/72469 |
| | | | | 715/857 |
| 8,631,345 | B2 * | 1/2014 | Kawaguchi | G06F 3/04817 |
| | | | | 715/788 |
| 8,907,990 | B2 | 12/2014 | Yanase | |
| 8,913,014 | B2 * | 12/2014 | Naganawa | G06F 3/03545 |
| | | | | 345/157 |
| 10,082,948 | B2 * | 9/2018 | Chang | G06F 3/0488 |
| 10,284,812 | B1 * | 5/2019 | Van Os | H04L 51/046 |
| 10,681,419 | B2 * | 6/2020 | Kim | H04N 21/27 |
| 11,224,330 | B2 * | 1/2022 | Levy | H04N 23/698 |
| 11,334,243 | B2 * | 5/2022 | Yoshikawa | G06F 3/04842 |
| 2002/0089546 | A1 * | 7/2002 | Kanevsky | G09G 5/14 |
| | | | | 715/800 |

(Continued)

FOREIGN PATENT DOCUMENTS

| | | |
|---|---|---|
| JP | 2008-134901 A | 6/2008 |
| JP | 2009-503722 A | 1/2009 |

(Continued)

OTHER PUBLICATIONS

Mar. 26, 2024 Notice of Reasons for Refusal issued in Japanese Patent Application No. 2020-163844.

*Primary Examiner* — Linh K Pham
(74) *Attorney, Agent, or Firm* — Oliff PLC

(57) ABSTRACT

An information processing apparatus includes a processor configured to detect whether a first display component is superimposed on a second display component, and, if the first display component is superimposed on the second display component, change at least one of display of the first display component and display of the second display component to eliminate the superimposition.

11 Claims, 17 Drawing Sheets

(56) References Cited

U.S. PATENT DOCUMENTS

| | | | |
|---|---|---|---|
| 2007/0033522 A1 | 2/2007 | Lin et al. | |
| 2007/0097022 A1* | 5/2007 | Willebrand | G06F 8/20 345/10 |
| 2007/0192695 A1* | 8/2007 | Grotjohn | G06F 3/0483 715/713 |
| 2007/0282783 A1* | 12/2007 | Singh | G06F 16/40 |
| 2007/0285521 A1* | 12/2007 | Watanabe | H04N 23/683 348/208.99 |
| 2009/0254855 A1* | 10/2009 | Kretz | G06F 3/04812 715/800 |
| 2009/0315867 A1* | 12/2009 | Sakamoto | G06F 3/0488 345/184 |
| 2010/0283800 A1* | 11/2010 | Cragun | G09B 21/008 345/661 |
| 2011/0093816 A1* | 4/2011 | Chang | G06F 3/0488 715/835 |
| 2012/0206487 A1* | 8/2012 | Suzuki | H04N 13/156 345/635 |
| 2014/0006988 A1* | 1/2014 | Yamamura | G06F 3/04886 715/765 |
| 2015/0207833 A1* | 7/2015 | Tsubotani | G06F 3/04845 715/753 |
| 2015/0363049 A1* | 12/2015 | Sadouski | H04N 21/4858 345/173 |
| 2016/0162966 A1* | 6/2016 | Naficy | G06Q 30/0633 705/26.5 |
| 2016/0248922 A1* | 8/2016 | Kurumasa | H04N 1/00204 |
| 2017/0269801 A1* | 9/2017 | Yun | G06F 3/0483 |
| 2017/0309248 A1* | 10/2017 | Mori | B62D 15/0295 |
| 2018/0007449 A1* | 1/2018 | Carlson | H04N 21/42209 |
| 2018/0081602 A1* | 3/2018 | Ueda | G06F 3/125 |
| 2018/0181279 A1* | 6/2018 | Jeon | G06F 3/1475 |
| 2020/0326939 A1* | 10/2020 | Ware | G06F 17/10 |
| 2023/0252957 A1* | 8/2023 | Hung | G09G 5/14 715/790 |

FOREIGN PATENT DOCUMENTS

| | | |
|---|---|---|
| JP | 2011-34568 A | 2/2011 |
| JP | 2012-168680 A | 9/2012 |
| JP | 2013-012041 A | 1/2013 |
| JP | 2017-032590 A | 2/2017 |
| JP | 2020-091392 A | 6/2020 |

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-163844 filed Sep. 29, 2020.

BACKGROUND

(i) Technical Field

The present disclosure relates to an information processing apparatus and a non-transitory computer readable medium.

(ii) Related Art

Japanese Unexamined Patent Application Publication (Translation of PCT Application) No. 2009-503722 discloses a method of presenting a graphical user interface (GUI). In the method, at least one web-based template is established. The template is used to define the default GUI which corresponds to the default screen resolution and which includes multiple components having corresponding parameters in the template. A GUI is presented on a display apparatus by using the parameters which are altered as appropriate for a resolution different from the default resolution.

Japanese Unexamined Patent Application Publication No. 2008-134901 discloses an information processing apparatus which enables input of operations corresponding to buttons by using a pointing unit which points to one or more buttons disposed in a window displayed on a display unit. The information processing apparatus includes an acquiring unit, a calculating unit, an arranging unit, a first adding unit, and a changing unit. The acquiring unit acquires arrangement information of the buttons from a storage unit storing the arrangement information of the buttons arranged on the window. In change of the size of the window, the calculating unit calculates the number of buttons which may be disposed on the window, whose size has been changed, on the basis of the changed size of the window. The arranging unit selects buttons, whose number is equal to the number of buttons calculated by the calculating unit, from the buttons arranged in the window, and arranges the selected buttons on the window. Based on the arrangement information of the buttons acquired by the acquiring unit, the first adding unit adds, to the buttons arranged by the arranging unit, one or more sub-buttons associated with the one or more unarranged buttons, respectively, which are not arranged by the arranging unit. In response to a first instruction transmitted to a sub-button by the pointing unit, the changing unit changes, for arrangement, the button, to which the sub-button is added, to a different button associated with the sub-button.

Japanese Unexamined Patent Application Publication No. 2011-34568 discloses a display system which is connected to a display apparatus via a display-data storage unit. The display system stores image data in the display-data storage unit, and thus displays the image data in a display area on the display apparatus. The display system includes a main storage unit, a display-area size acquiring unit, a character-size setting unit, and a drawing unit. The main storage unit stores display data, a standard display-frame size, and a standard character size. The display data includes a display frame and display components which are disposed in the display frame and which perform predetermined operations. The standard display-frame size is a reference size of the display frame which is determined in a stage of designing or developing the display system. The standard character size is a temporary character size determined in accordance with the standard display-frame size, and is a reference size of characters added to the display components. In generation of image data based on the display data, the display-area size acquiring unit acquires the display-area size which is the actual size of the display frame displayed in the display area. The character-size setting unit determines the character size for correction of the standard character size based on the magnitude of the display-area size determined in accordance with the reference which is the standard display-frame size. The character-size setting unit sets the determined character size to the display data as the actual character size of characters added to the display components. The drawing unit generates image data of the frame data and the display components, to which characters of the determined character size have been added, on the basis of the display data. The drawing unit stores the image data in the display-data storage unit different from the main storage unit, and thus displays the image data in the display area.

SUMMARY

Aspects of non-limiting embodiments of the present disclosure relate to an information processing apparatus and a non-transitory computer readable medium which achieve avoidance of superimposition between display components.

Herein, a display component indicates a command which is submitted to a computer and which is displayed on a screen, for example, by using characters, a symbol, and a figure. Examples of a display component include an icon, a button, and a widget.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to detect whether a first display component is superimposed on a second display component. If the first display component is superimposed on the second display component, the processor is configured to change at least one of display of the first display component and display of the second display component to eliminate the superimposition.

BRIEF DESCRIPTION OF THE DRAWINGS

Exemplary embodiment of the present disclosure will be described in detail based on the following figures, wherein.

DETAILED DESCRIPTION

Figure 1:
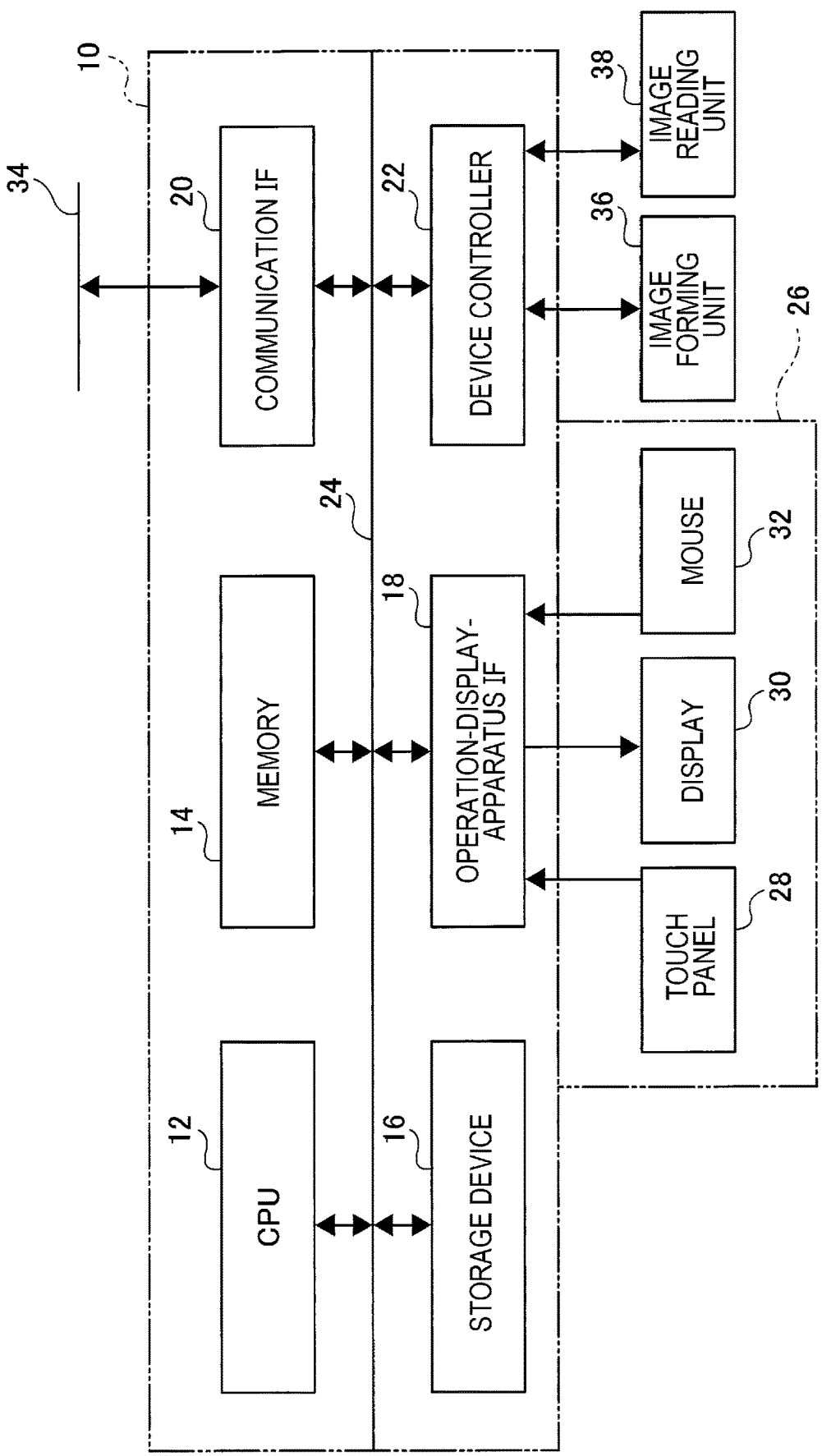
FIG. 1 is a block diagram illustrating the hardware configuration of an information processing apparatus according to an exemplary embodiment of the present disclosure.

An exemplary embodiment of the present disclosure will be described in detail by referring to the drawings.

FIG. 1 illustrates an information processing apparatus 10 according to the exemplary embodiment of the present disclosure. The information processing apparatus 10 controls a device, for example, which is an image forming apparatus.

The information processing apparatus 10 includes a processor 12, a memory 14, a storage device 16, an operation-display-apparatus interface 18, a communication interface 20, and a device controller 22 which are connected to each other through a bus 24.

The processor 12 performs predetermined processes on the basis of control programs stored in the memory 14. The storage device 16, which is formed, for example, of a hard disk, stores necessary software and data. The information processing apparatus 10 also includes an operation display apparatus 26 connected to the operation-display-apparatus interface 18. The operation display apparatus 26, which includes a touch panel 28, a display 30, and a mouse 32 which is a position pointing unit, receives operation data from the touch panel 28 and the mouse 32, and transmits display data to the display 30.

The communication interface 20, which is connected to terminal apparatuses and servers over a local area network (LAN) 34, receives, from the terminal apparatuses, requests to form images, or transmits images to the terminal apparatuses and the servers. The connection target is not limited to a LAN. Alternatively, the communication interface 20 may be connected to the terminal apparatuses and the servers over the Internet.

The device controller 22, which is connected to an image forming unit 36 and an image reading unit 38, forms images on recording media by using the image forming unit 36, or reads documents by using the image reading unit 38.

Figure 2:
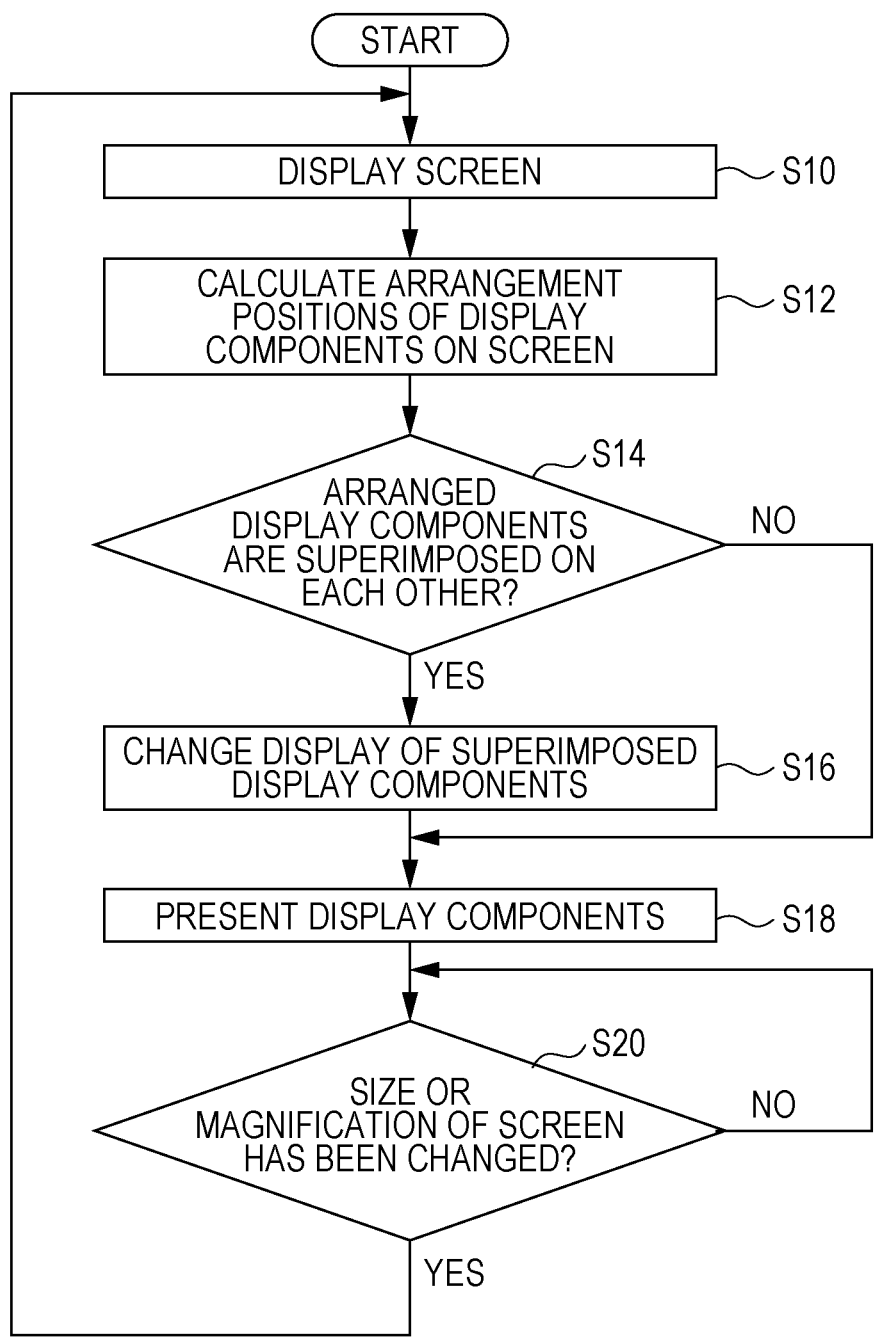
FIG. 2 is a flowchart of operations of an information processing apparatus according to an exemplary embodiment of the present disclosure.

FIG. 2 illustrates a process flow performed by the processor 12.

In step S10, the processor 12 displays a screen on the display 30 described above.

In step S12, the processor 12 calculates the arrangement positions of display components on the screen.

In step S14, the processor 12 determines whether arranged display components are superimposed on each other. If the processor 12 determines that arranged display components are superimposed on each other in step S14, the process proceeds to step S16. In step S16, the processor 12 changes display of the superimposed display components, and the process proceeds to step S18. The change in display of the superimposed display components will be described in detail below.

In contrast, if the processor 12 determines that no arranged display components are superimposed on each other in step S14, the process proceeds to step S18. In step S18, the processor 12 presents the display components.

In step S20 which is the next step, the processor 12 determines whether the size or magnification of the screen has been changed. If the processor 12 determines that the size or magnification of the screen has been changed in step S20, the process returns to step S10. In contrast, if the processor 12 determines that the size or magnification of the screen has not been changed in step S20, the processor 12 repeatedly performs the determination in step S20, and waits until the size or magnification of the screen is changed.

Examples in which display components are superimposed on each other will be described.

Figure 3:
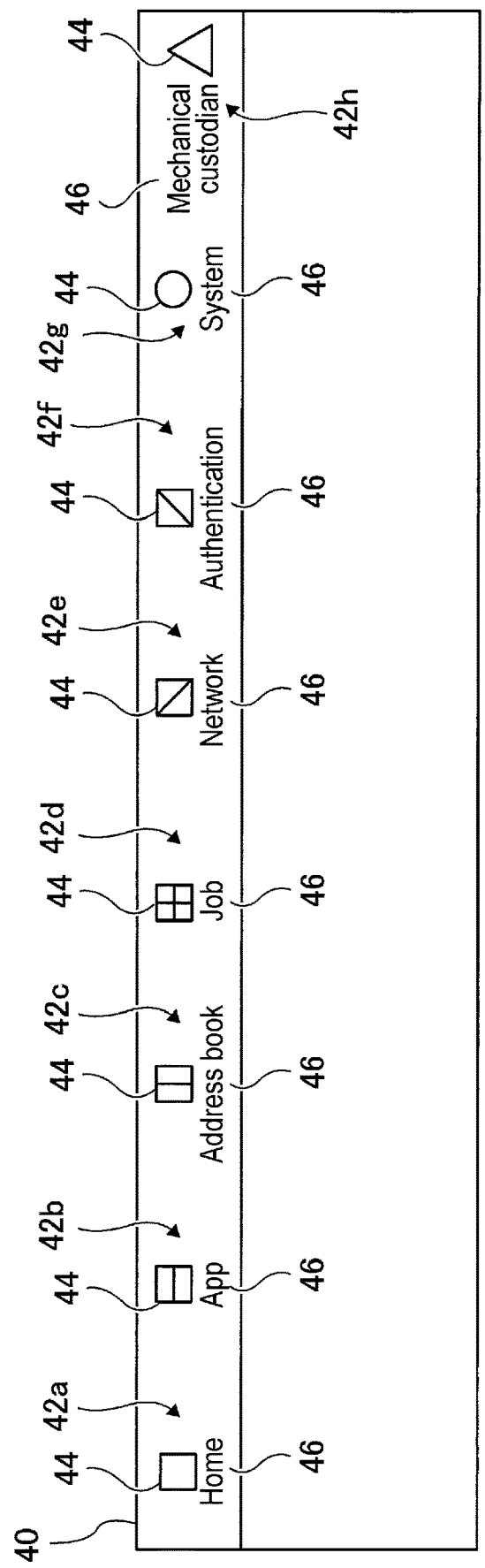
FIG. 3 is a diagram illustrating a screen which depicts the initial state in English according to an exemplary embodiment of the present disclosure.

FIG. 3 illustrates the initial state example in which eight display components 42a, 42b, 42c, 42d, 42e, 42f, 42g, and 42h are arranged and displayed in the horizontal direction on a screen 40.

Each of the display components 42a to 42h includes an image part 44, which is formed of a figure, and a string part 46 which is formed of a string. The display component 42a indicates "Home"; the display component 42b indicates "Application"; the display component 42c indicates "Address book"; the display component 42d indicates "Job"; the display component 42e indicates "Network"; the display component 42f indicates "Authentication"; the display component 42g indicates "System"; the display component 42h indicates "Mechanical custodian". The display components 42a to 42h are, for example, tab buttons. For example, when the display component 42b is pointed to, a list of applicable applications appears downward of the screen 40. Each of the display components 42a to 42h includes the image part 44, which is formed of a figure or a symbol, and the string part 46 which is formed of a string. Each string part 46 is illustrated, for example, in English. The seven display components 42a to 42g on the left are disposed at corresponding predetermined positions relative to a reference which is the left end of the screen 40. In contrast, the display component 42h on the right is disposed at a predetermined position relative to a reference which is the right end of the screen 40.

Figure 4:
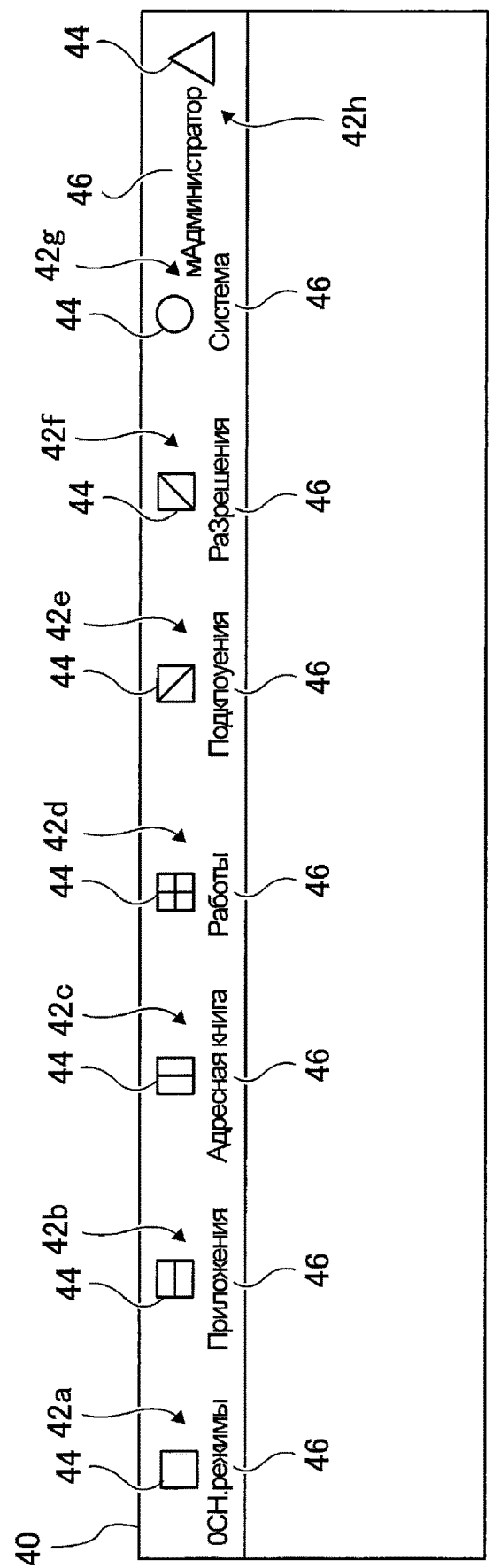
FIG. 4 is a diagram illustrating a screen which depicts the initial state in Russian according to an exemplary embodiment of the present disclosure.

FIG. 4 illustrates the case in which the string parts 46 of the display components 42a to 42h are displayed in Russian. The "Mechanical custodian" of the display component 42h in Russian is long, and the string part 46 of the display component 42h is superimposed on the string part 46 of the display component 42g.

Figure 5:
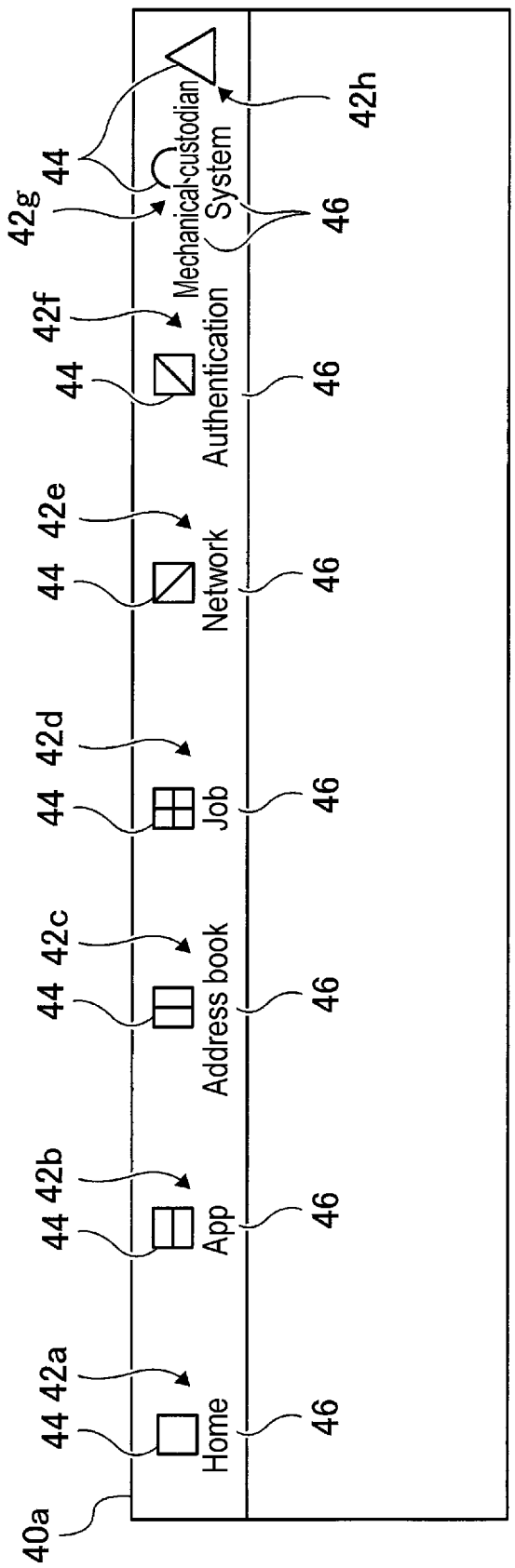
FIG. 5 is a diagram illustrating a screen obtained by reducing the screen in FIG. 3 in the horizontal direction.

FIG. 5 illustrates a screen 40a obtained by reducing the screen 40 in FIG. 3 in the horizontal direction. Since the arrangement position of the display component 42h is determined relative to the reference which is the right end of the screen 40a, the display component 42h is superimposed on the display component 42g.

In FIG. 5, the case of reduction of the screen 40 is described. The case of enlargement of the screen 40 may cause such superimposition. Other than the size of the screen 40, the case of change of the magnification of the screen may cause such superimposition. Therefore, in step 20 illustrated in FIG. 2, it is determined whether the size or magnification of the screen has been changed.

Examples of the present disclosure will be described.

Figure 6:
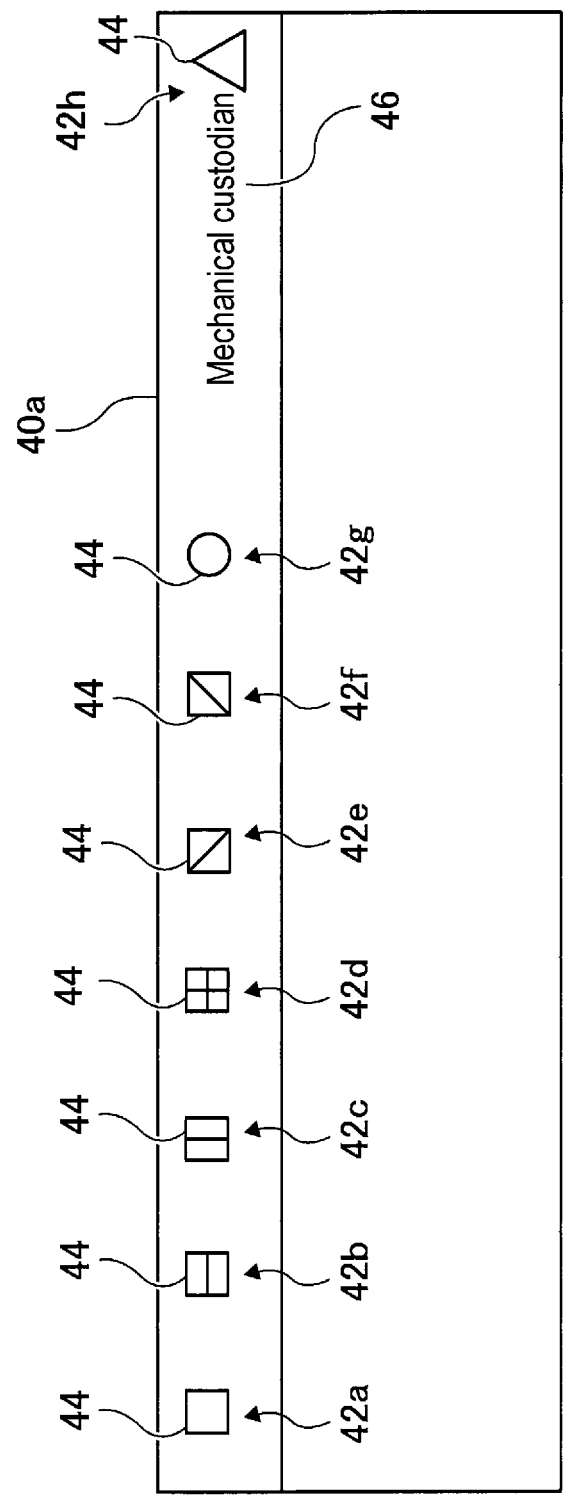
FIG. 6 is a diagram illustrating a screen which depicts a first example of the present disclosure.

FIG. 6 illustrates a first example. In the first example, the string parts 46 of the display components 42a to 42g on the reduced screen 40a which are illustrated in FIG. 5 are omitted, and the arrangement of the display components 42a to 42g is put in order. Thus, the display component 42h is not superimposed on the display component 42g.

Figure 7:
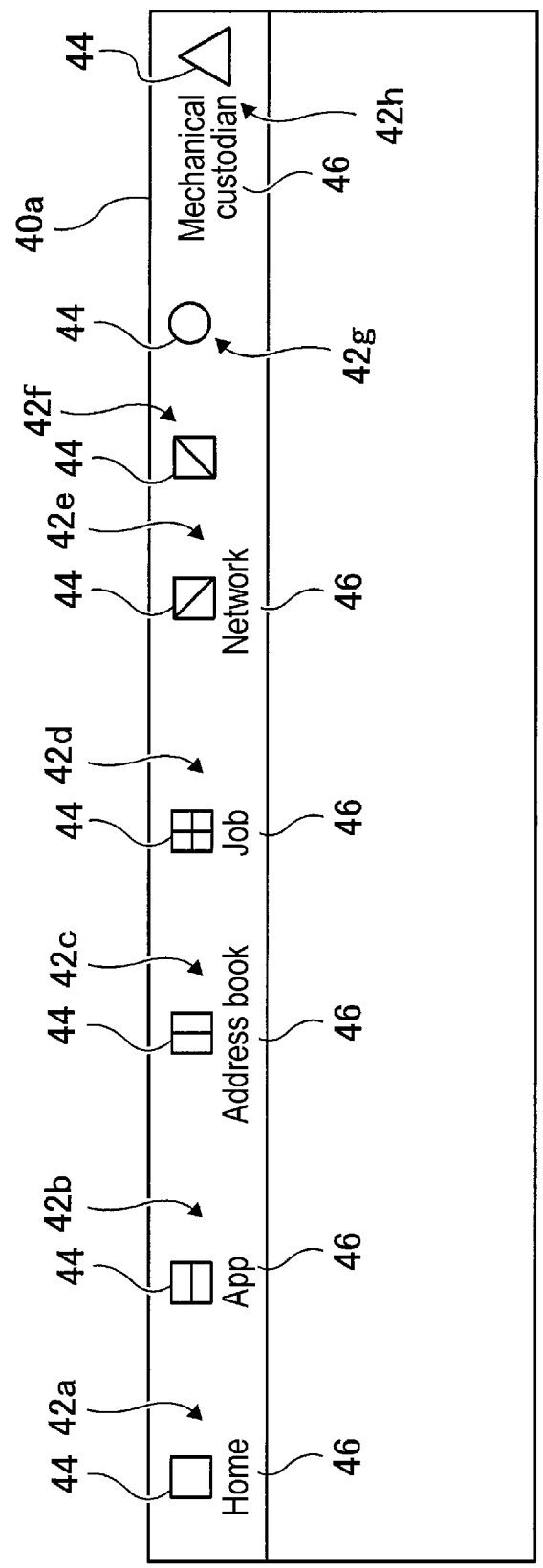
FIG. 7 is a diagram illustrating a screen which depicts a second example of the present disclosure.

FIG. 7 illustrates a second example. In the first example, all the string parts 46 of the display components 42a to 42g are omitted. In the second example, some of the display components 42a to 42g, for example, the string parts of the display components 42f and 42g, are omitted so that the display component 42h is not superimposed on the display component 42g.

Figure 8:
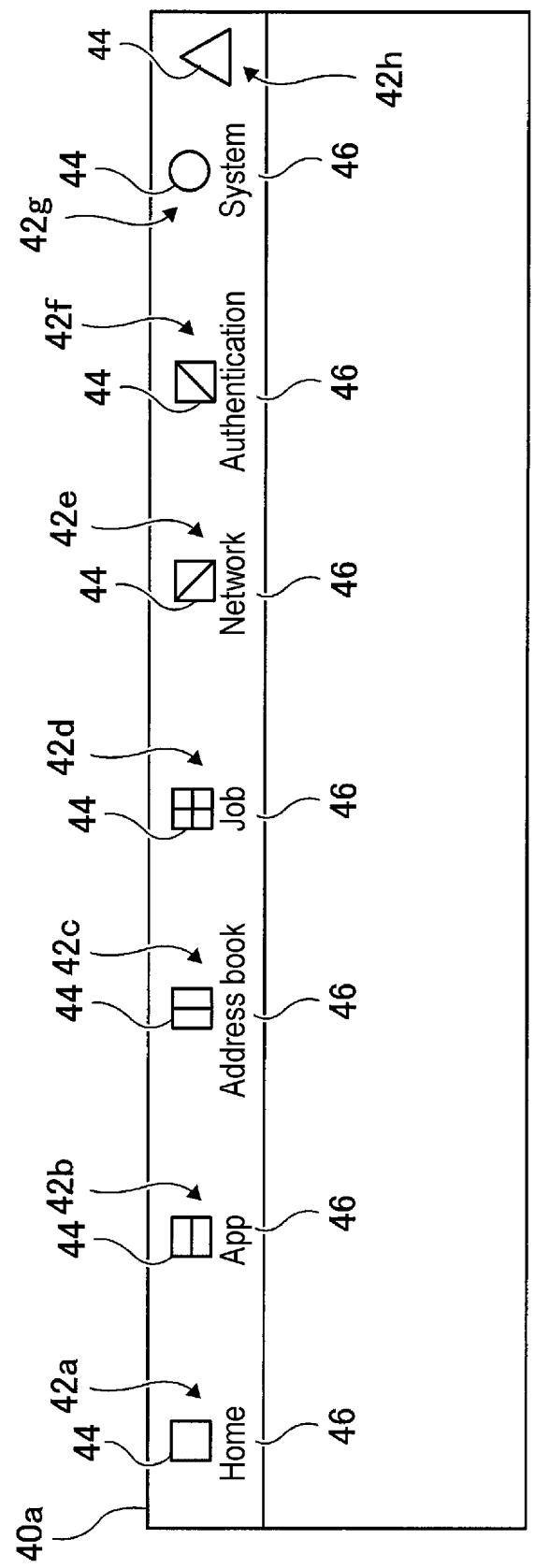
FIG. 8 is a diagram illustrating a screen which depicts a third example of the present disclosure.

FIG. 8 illustrates a third example. In the third example, the string part 46 of the display component 42h on the right is omitted.

Figure 9:
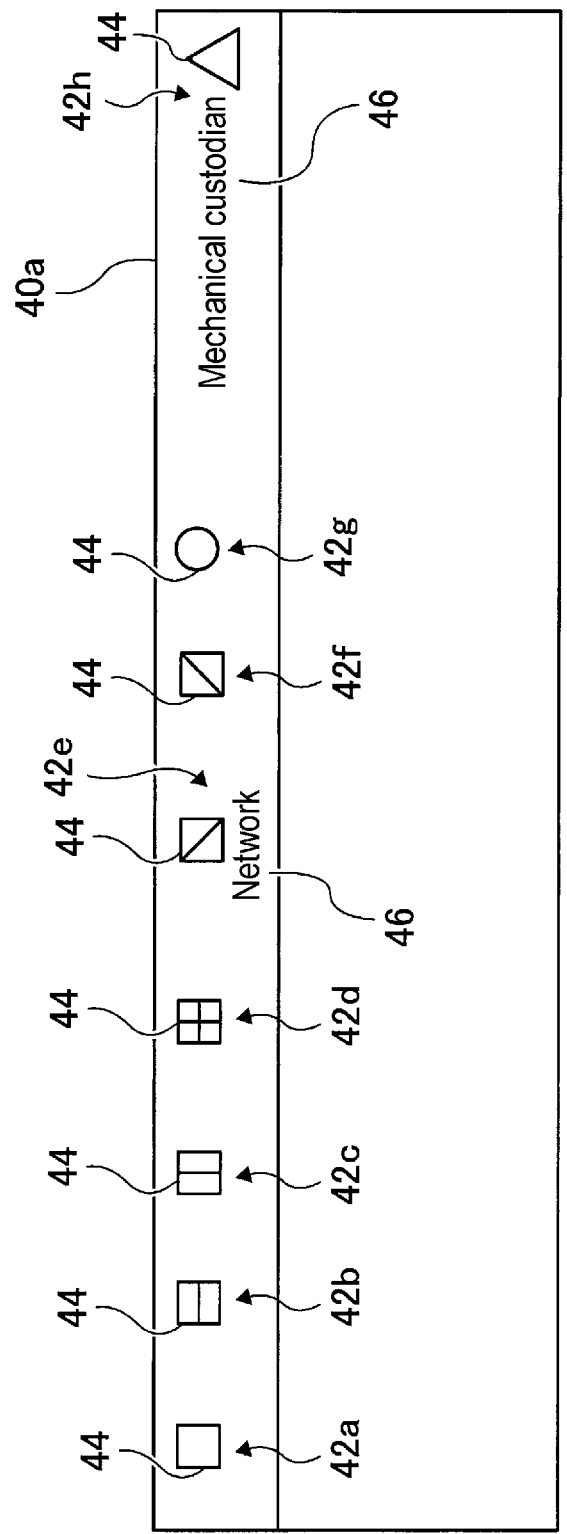
FIG. 9 is a diagram illustrating a screen which depicts a fourth example of the present disclosure.

FIG. 9 illustrates a fourth example. In the fourth example, for example, when the mouse 32 is used to move the cursor position to the display component 42e in the first example, the string part 46, "Network", of the display component 42e is displayed.

Figure 10:
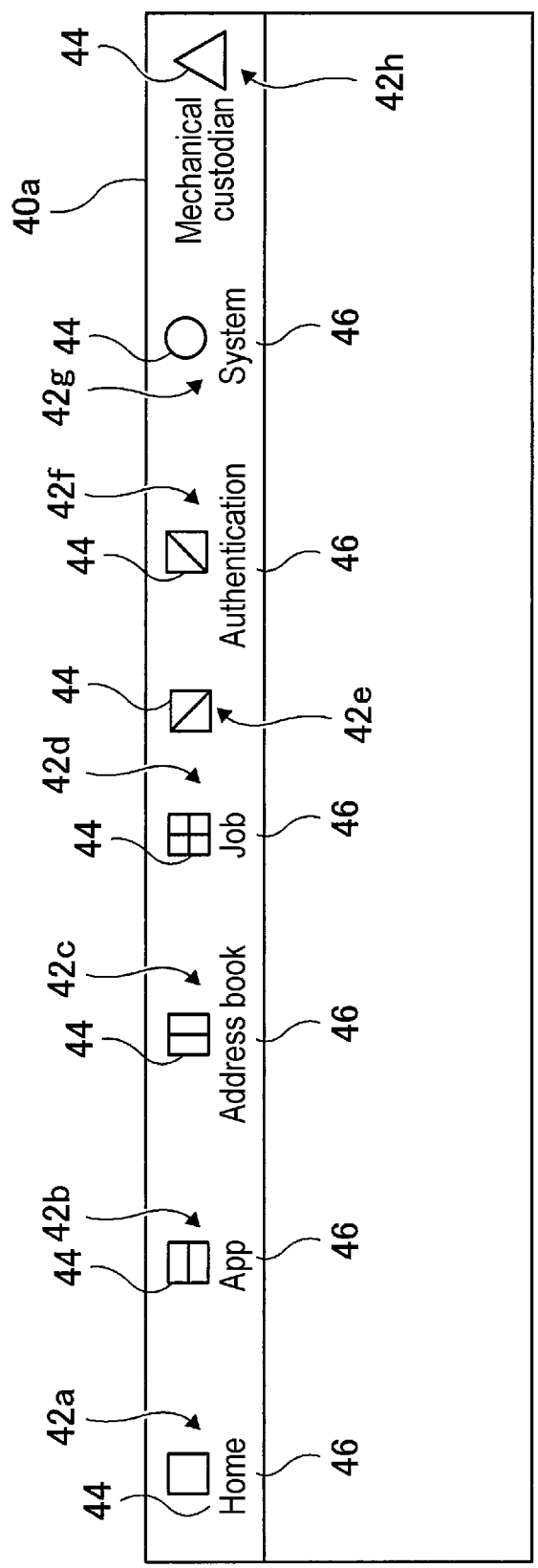
FIG. 10 is a diagram illustrating a screen which depicts a fifth example of the present disclosure.

FIG. 10 illustrates a fifth example. In the fifth example, the display components 42a to 42h are tabs. When any of the display components 42a to 42h is selected, the corresponding page is displayed. In this case, the content of the selected one of the display components 42a to 42h is displayed on the page. Thus, a user may understand the content even when the string part is omitted. For example, in the fifth example, the display component 40e is being selected, and the content of "Network" is displayed on the page. Thus, the string part 46, "Network", is omitted.

Figure 11:
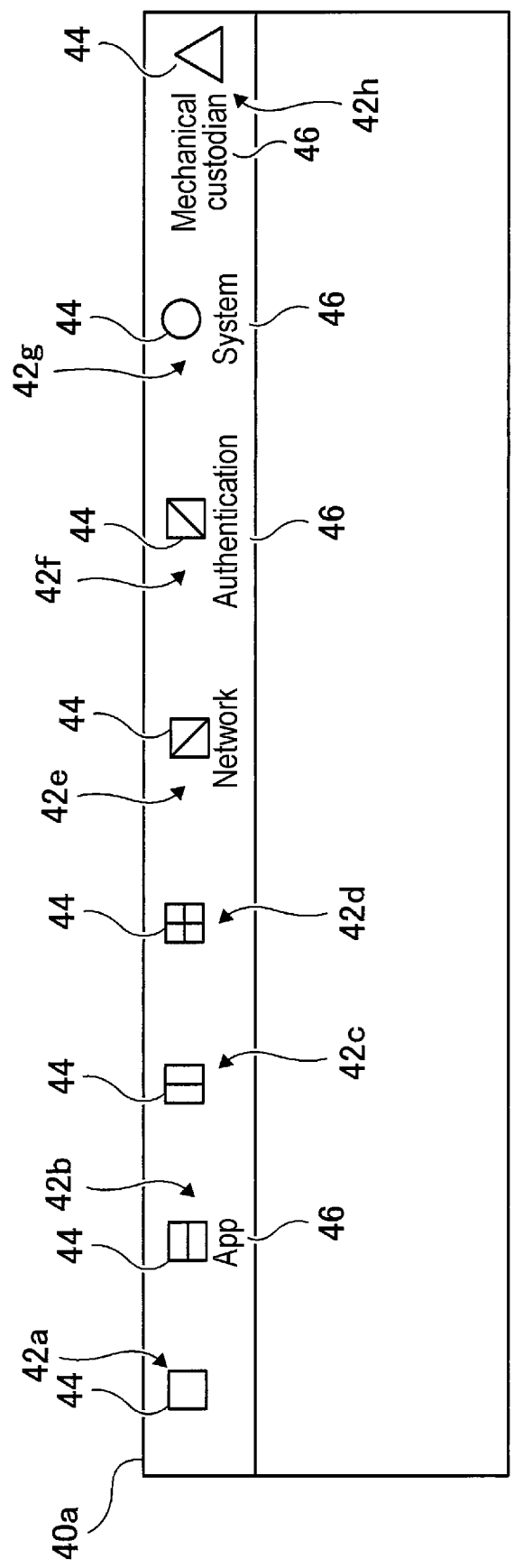
FIG. 11 is a diagram illustrating a screen which depicts a sixth example of the present disclosure.

FIG. 11 illustrates a sixth example. In the sixth example, a user selects, from the display components 42a to 42h, display components whose string parts 46 are to be omitted. The information processing apparatus 10 needs user authentication, and obtains user information. Using the obtained user information, display components, whose string parts 46 are to be omitted, are selected from the display components 42a to 42h. In the sixth example, the string parts 46 of the display components 42a, 42c, and 42d are omitted. The string parts for the functions used frequently by a user may be omitted. It is determined whether a display component is frequently used, under a condition, for example, about the frequency of use, the time of use, or use in manual settings.

Figure 12:
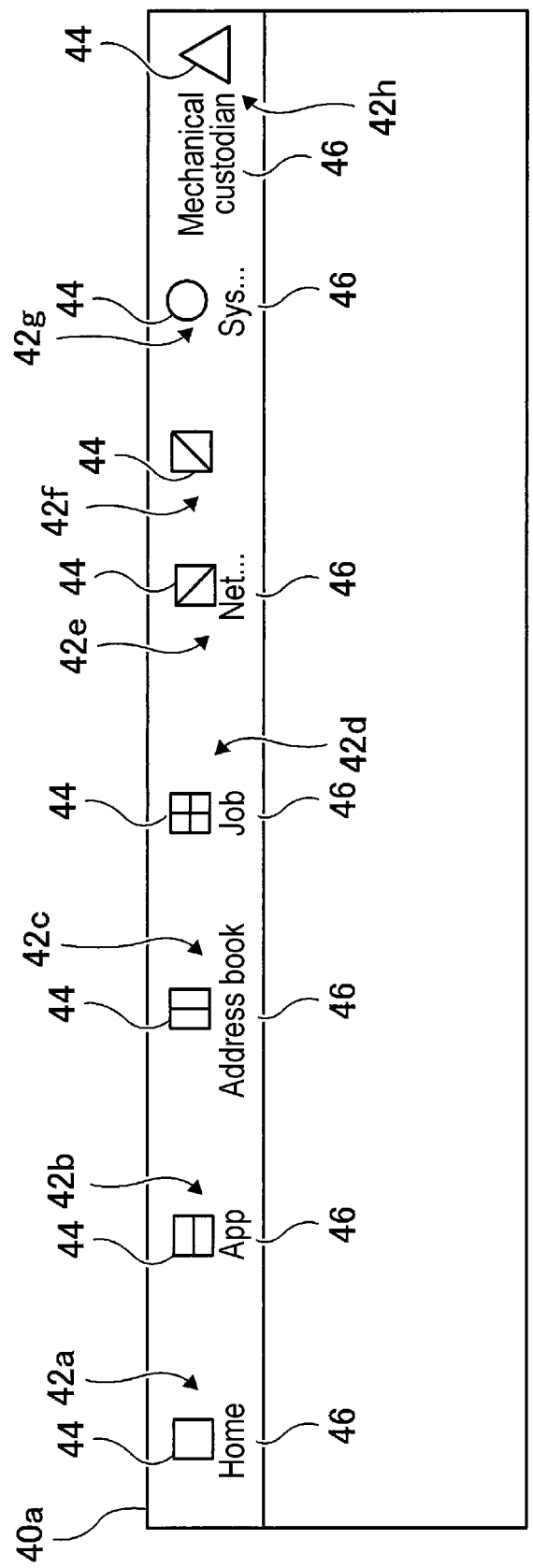
FIG. 12 is a diagram illustrating a screen which depicts a seventh example of the present disclosure.

FIG. 12 illustrates a seventh example. In the seventh example, multiple thresholds, for example, for the frequency of use and the time of use are set to the screen in the sixth example. The display form is changed in stages. That is, the whole string of the string part 46 is omitted for the display component 42f whose frequency of use is equal to or greater than M (M is an integer greater than N). Parts of the strings of the string parts 46 are omitted for the display components 42e and 42g whose frequency of use is equal to or greater than N and less than M.

Figure 13A:
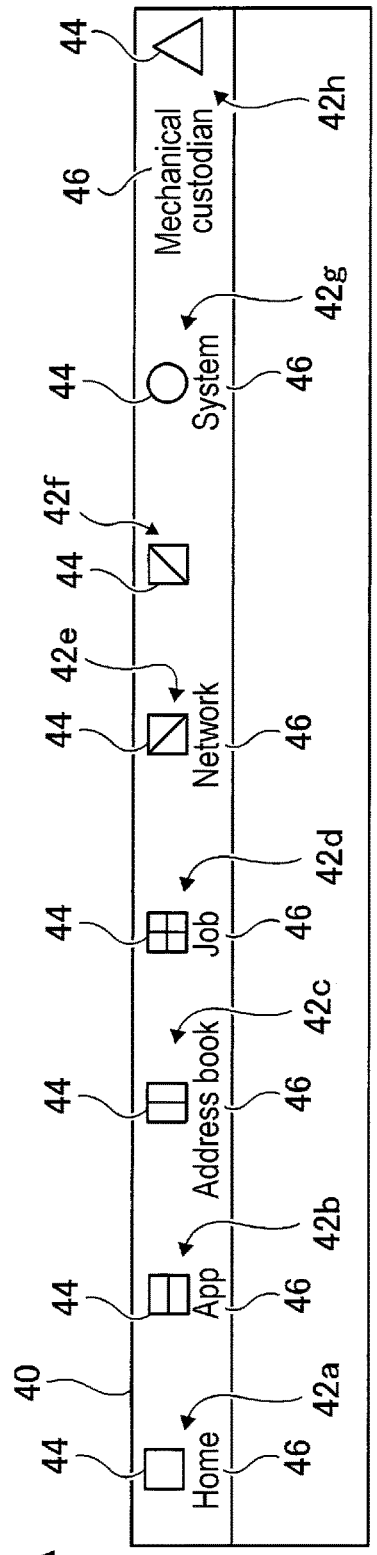
FIGS. 13A to 13C are diagrams illustrating screens which depict an eighth example of the present disclosure.
Figure 13B:
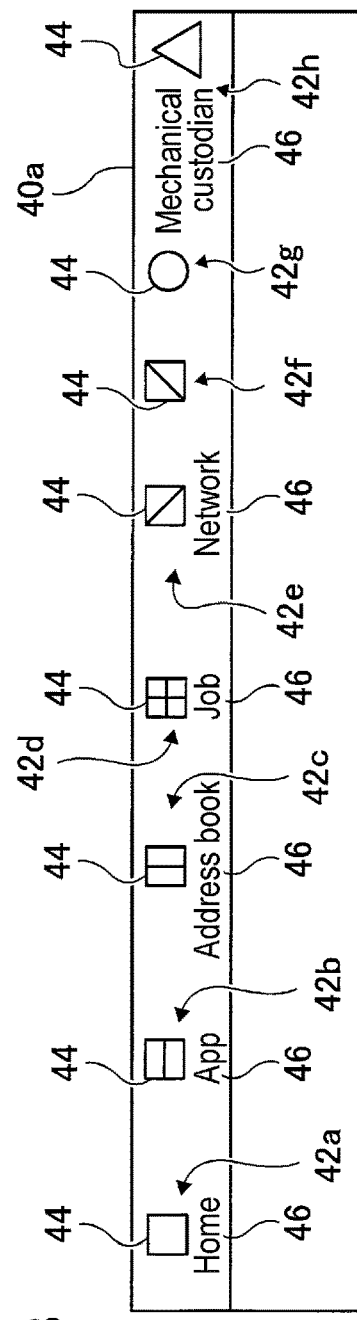
Figure 13C:
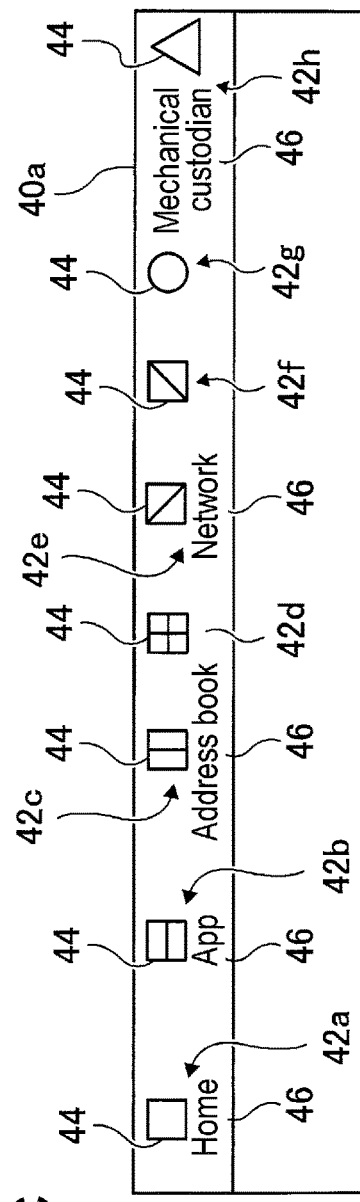

FIGS. 13A to 13C illustrate an eighth example. In the eighth example, priority for omission is given to functions used frequently by a user, and display of display components is changed in the ascending order of priority. That is, if the priority for the display component 42f, the display component 42g, and the display component 42d ascends in this sequence, the string part 46 of the display component 42f is omitted in FIG. 13A. When the state in FIG. 13A is changed to the state in FIG. 13B by reducing the screen 40, the string part 46 of the display component 42g is omitted in addition to that of the display component 42f. When the state in FIG. 13B is changed to the state in FIG. 13C by further reducing the screen 40, the string part of the display component 42d is omitted in addition to those of the display components 42f and 42g.

Figure 14:
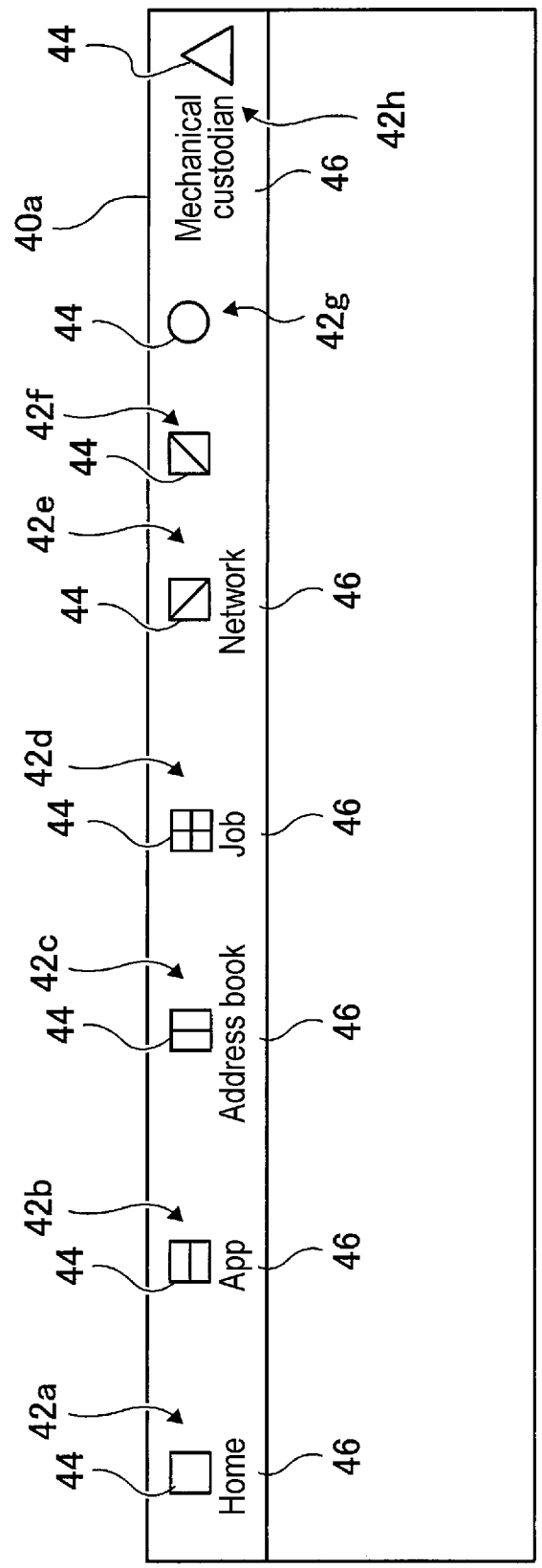
FIG. 14 is a diagram illustrating a screen which depicts a ninth example of the present disclosure.

FIG. 14 illustrates a ninth example. In the ninth example, display is changed differently depending on the user type. For example, if a user is a mechanical custodian, the user frequently uses the authentication function of the display component 42f and the system function of the display component 42g. Thus, the string parts 46 of the display components 42f and 42g are omitted. Conversely, the string parts of the display components other than those for frequent-use functions may be omitted.

Figure 15:
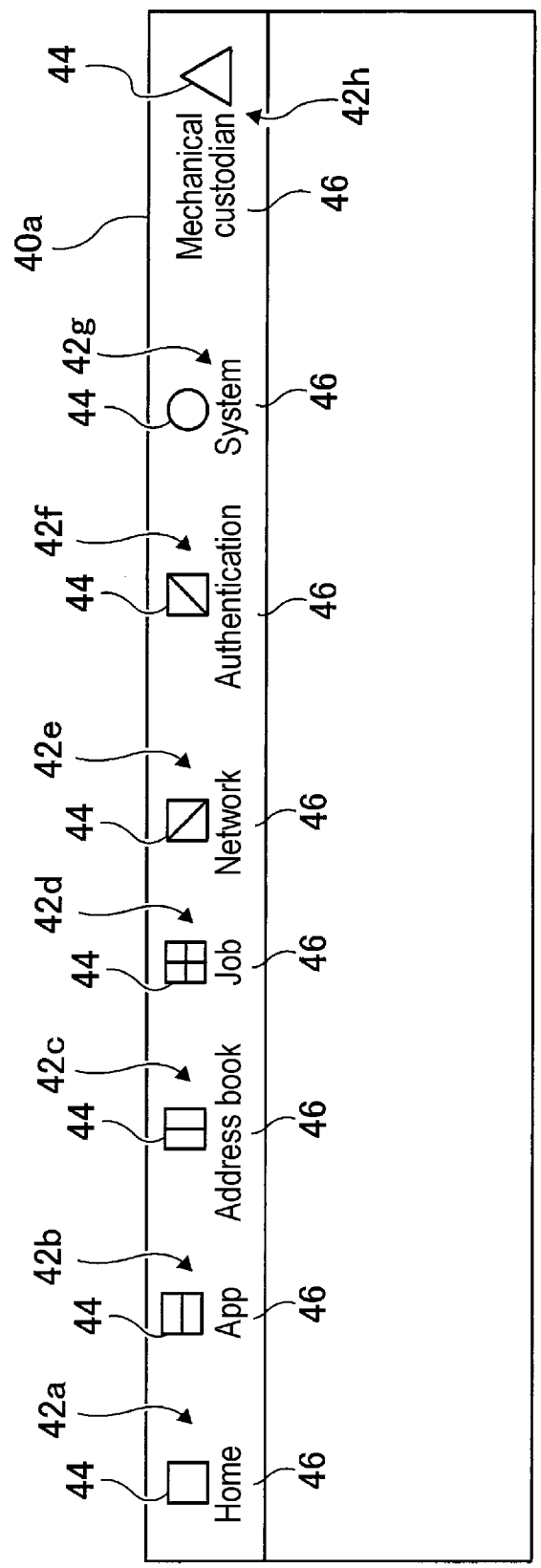
FIG. 15 is a diagram illustrating a screen which depicts a tenth example of the present disclosure.

FIG. 15 illustrates a tenth example. In the tenth example, display of the display components 42a to 42h is not omitted. Instead, the display of the display components 42a to 42h is reduced.

Figure 16:
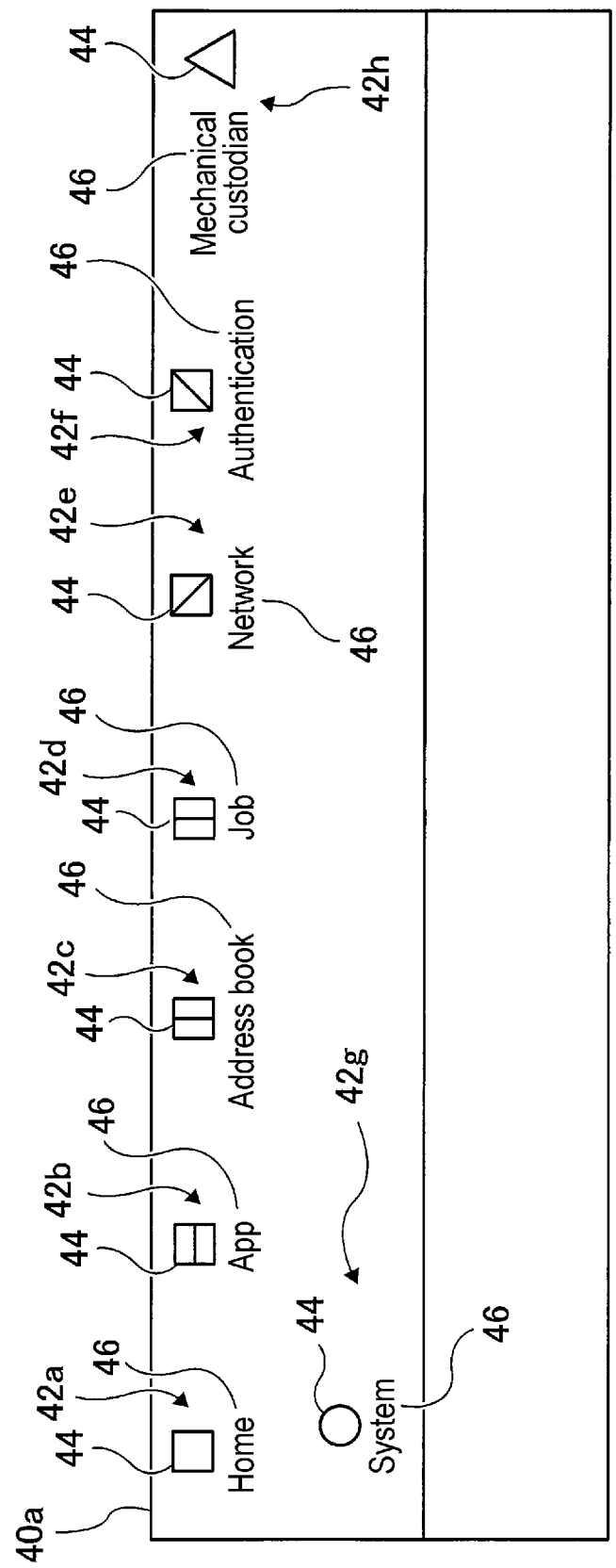
FIG. 16 is a diagram illustrating a screen which depicts an eleventh example of the present disclosure.

FIG. 16 illustrates an eleventh example. In the eleventh example, display of the display components 42a to 42h is not omitted and is enlarged, resulting in display in two rows. That is, the display components 42a to 42f and 42h are displayed in the first row, and the display component 42g is displayed in the second row. Instead of enlargement of the screen, the two-row display may be made when the screen is reduced in the horizontal direction.

Figure 17:
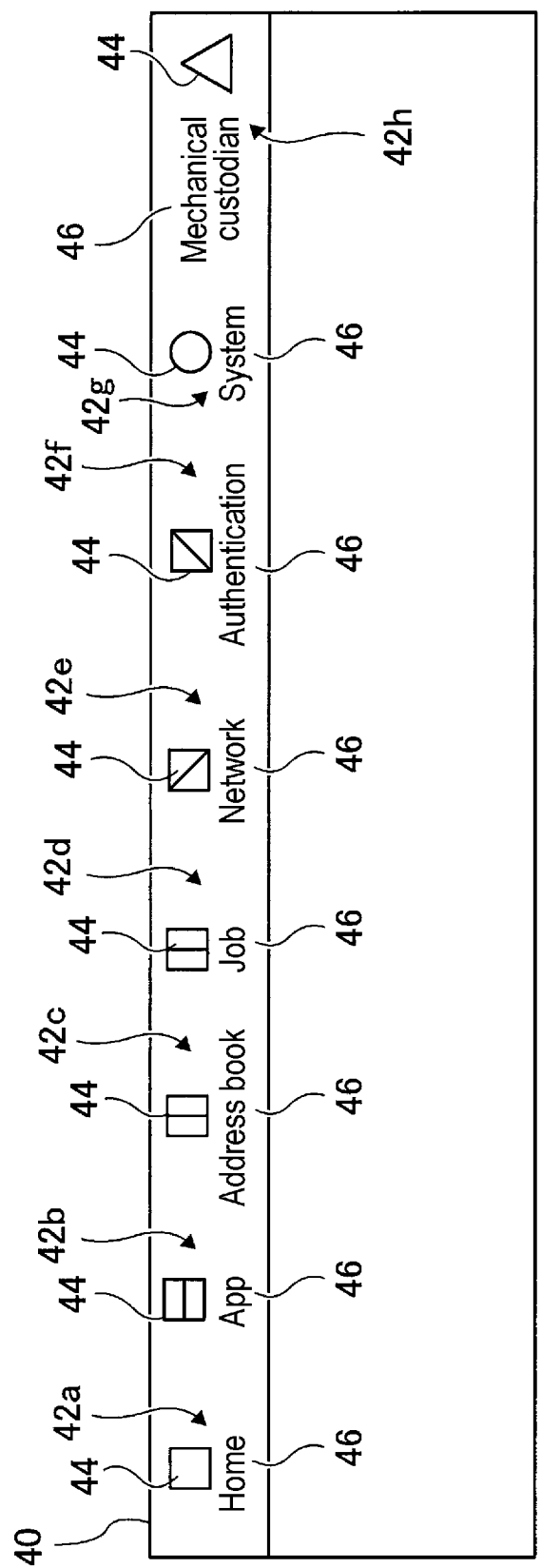
FIG. 17 is a diagram illustrating a screen which depicts a twelfth example of the present disclosure.

FIG. 17 illustrates a twelfth example. In the twelfth example, while the display of the display components 42a to 42h is as it is, the display components 42a to 42h are arranged so that the in-between space is made narrower.

In the description above, string parts 46 are omitted. Alternatively, image parts 44 may be omitted.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to
      detect whether a first display component is superimposed on a second display component, and,
      if the first display component is superimposed on the second display component, change at least one of display of the first display component and display of the second display component to eliminate the superimposition, wherein
      if the first display component is superimposed on the second display component, the at least one of the display of the first display component and display of the second display component is changed by changing an arrangement of at least one of the first display component and the second display component, without changing content of the first and second display components, such that the first display component and the second display component are respectively arranged on first and second rows.

2. The information processing apparatus according to claim 1,
   wherein the processor is configured to
      detect whether at least one of a size and a magnification of a screen is changed, and,
      if at least one of the size and the magnification of the screen is changed, detect whether the first display component is superimposed on the second display component.

3. The information processing apparatus according to claim 2,
   wherein the processor is configured to,
      if the first display component is superimposed on the second display component, reduce, for display, a size of a part of at least one of the first display component and the second display component.

4. The information processing apparatus according to claim 1, further comprising:
   a position pointing unit that points to a position,
   wherein the processor is configured to
      change display of at least one of the first display component and the second display component in accordance with the position of the position pointing unit.

5. The information processing apparatus according to claim 4,
   wherein the processor is configured to,
      if the position pointing unit is located at the first display component or the second display component, change display of the first display component or the second display component.

6. The information processing apparatus according to claim 1,
   wherein the processor is configured to,
      if the first display component is superimposed on the second display component, reduce, for display, a size of a part of at least one of the first display component and the second display component.

7. The information processing apparatus according to claim 4,
   wherein the processor is configured to,
      if the position pointing unit points to the first display component or the second display component, change display of the first display component or the second display component.

8. The information processing apparatus according to claim 1,
   wherein the processor is configured to
      obtain user information, and
      change display in accordance with the user's selection of the first display component or the second display component.

9. The information processing apparatus according to claim 8,
   wherein the display is changed in accordance with a frequency of use of the selected display component, the selected display component being the first display component or the second display component and being selected by the user.

10. The information processing apparatus according to claim 1,
    wherein the processor is configured to
       obtain user information, and
       change display of the first display component or the second display component differently in accordance with a type of the user.

11. A non-transitory computer readable medium storing a program causing a computer to execute a process comprising:
    detecting whether a first display component is superimposed on a second display component;
    if the first display component is superimposed on the second display component, changing at least one of display of the first display component and display of the second display component to eliminate the superimposition; and
    if the first display component is superimposed on the second display component, changing an arrangement of at least one of the first display component and the second display component without changing content of the first and second display components, wherein the first display component and the second display component are respectively arranged on first and second rows.

* * * * *